US011803488B2

(12) United States Patent
Chang

(10) Patent No.: US 11,803,488 B2
(45) Date of Patent: Oct. 31, 2023

(54) HIGH-SPEED TRANSMISSION SYSTEM, SIGNAL REDRIVER, AND CONTROL METHOD OF SIGNAL REDRIVER

(71) Applicant: GENESYS LOGIC, INC., New Taipei (TW)

(72) Inventor: Nai-Jen Chang, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 40 days.

(21) Appl. No.: 17/727,818

(22) Filed: Apr. 25, 2022

(65) Prior Publication Data

US 2023/0004504 A1 Jan. 5, 2023

(30) Foreign Application Priority Data

Jun. 30, 2021 (TW) ................... 110124074

(51) Int. Cl.
*G06F 3/00* (2006.01)
*G06F 13/10* (2006.01)
(Continued)

(52) U.S. Cl.
CPC ............ *G06F 13/102* (2013.01); *G06F 1/266* (2013.01); *G06F 13/4068* (2013.01)

(58) Field of Classification Search
CPC ....................................................... G06F 9/54
(Continued)

(56) References Cited

U.S. PATENT DOCUMENTS 6,334,161 B1 * 12/2001 Suzuki .................. G06F 3/1236
714/36
6,351,820 B1 * 2/2002 Oh-Yang ................. H04L 12/12
713/323

(Continued)

FOREIGN PATENT DOCUMENTS

EP 0973305 1/2000
TW 201347443 11/2013
TW M620009 11/2021

OTHER PUBLICATIONS

Satoshi Yoshima, Recent progress of high-speed burst-mode transceiver technologies for TDM-PON systems. (Year: 2012).*

(Continued)

*Primary Examiner* — Lechi Truong
(74) *Attorney, Agent, or Firm* — JCIPRNET

(57) ABSTRACT

The high-speed transmission system includes a transmitting device, a receiving device, and the signal redriver. The signal redriver includes a terminal resistor. A high-speed receiving end and a high-speed transmitting end of the signal redriver are respectively coupled to a high-speed transmitting end of the transmitting device and a high-speed receiving end of the receiving device. The signal redriver is coupled to a control signal transceiving end of the transmitting device and a control signal transceiving end of the receiving device. The signal redriver monitors a control signal transmitted between the transmitting device and the receiving device and determines whether to enter a SLEEP mode based on the control signal. The terminal resistor of the signal redriver in the SLEEP mode is continuously coupled to the high-speed receiving end of the signal redriver.

20 Claims, 4 Drawing Sheets

(51) Int. Cl.
   *G06F 1/26*      (2006.01)
   *G06F 13/40*     (2006.01)
(58) Field of Classification Search
   USPC .......................................................... 719/310
   See application file for complete search history.

(56) References Cited

U.S. PATENT DOCUMENTS

| | | | | |
|---|---|---|---|---|
| 6,603,737 | B1* | 8/2003 | Fukunaga | H04L 12/40058 370/252 |
| 6,934,870 | B1* | 8/2005 | Amos | G06F 13/423 713/320 |
| 2001/0042142 | A1* | 11/2001 | Fukunaga | H04N 21/4108 709/227 |
| 2002/0057448 | A1* | 5/2002 | Ueda | H04N 1/33315 358/1.15 |
| 2002/0062407 | A1* | 5/2002 | Tateyama | G06F 3/1244 375/E7.025 |
| 2013/0166926 | A1* | 6/2013 | Yamamizu | H04N 1/00899 713/300 |
| 2017/0005718 | A1 | 1/2017 | Sloan et al. | |
| 2018/0048309 | A1 | 2/2018 | Vogt, IV et al. | |
| 2019/0288743 | A1 | 9/2019 | Wang et al. | |
| 2021/0056060 | A1* | 2/2021 | An | G06F 9/4411 |

OTHER PUBLICATIONS

"Notice of allowance of Taiwan Counterpart Application", dated May 9, 2022, p. 1-p. 4.

* cited by examiner

HIGH-SPEED TRANSMISSION SYSTEM, SIGNAL REDRIVER, AND CONTROL METHOD OF SIGNAL REDRIVER

CROSS-REFERENCE TO RELATED APPLICATION

This application claims the priority benefit of Taiwan patent application serial no. 110124074, filed on Jun. 30, 2021. The entirety of the above-mentioned patent application is hereby incorporated by reference herein and made a part of this specification.

BACKGROUND

Technical Field

The disclosure relates to a transmission system, and particularly relates to a high-speed transmission system, a signal redriver, and a control method of the signal redriver.

Description of Related Art

A signal redriver (which is also referred to as a repeater) may improve transmission quality of signals transmitted between a transmitting device and a receiving device. For instance, the signal redriver may be applied in a peripheral component interconnect express (PCIe) bus. However, the signal redriver currently applied in the PCIe bus does not have a SLEEP mode with extremely low power consumption. In order to save power, the entire signal redriver may be turned off according to the related art. If the signal redriver is turned off directly, a terminal resistor of the signal redriver may not comply with a PCIe specification. Besides, after the entire signal redriver is turned off, a start-up time required for turning on the signal redriver may be overly long. The overly long start-up time may lead to connection failure of a PCIe device or PCIe disconnection.

The information disclosed in this Background section is only for enhancement of understanding of the background of the described technology and therefore it may contain information that does not form the related art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a high-speed transmission system, a signal redriver, and a control method of the signal redriver, where the signal redriver may enter a SLEEP mode to reduce power consumption.

In an embodiment of the disclosure, the high-speed transmission system includes a transmitting device, a receiving device, and a signal redriver. The transmitting device has a first high-speed transmitting end and a first control signal transceiving end. The receiving device has a first high-speed receiving end and a second control signal transceiving end. The second control signal transceiving end is coupled to the first control signal transceiving end. The signal redriver includes a terminal resistor. The signal redriver is coupled between the transmitting device and the receiving device. The signal redriver has a second high-speed receiving end coupled to the first high-speed transmitting end of the transmitting device, and a second high-speed transmitting end coupled to the first high-speed receiving end of the receiving device. The signal redriver is coupled to the first control signal transceiving end and the second control signal transceiving end. The signal redriver monitors a control signal transmitted between the first control signal transceiving end of the transmitting device and the second control signal transceiving end of the receiving device. The signal redriver determines whether to enter a SLEEP mode based on the control signal. The terminal resistor of the signal redriver is continuously coupled to the second high-speed receiving end of the signal redriver in the SLEEP mode.

In an embodiment of the disclosure, the signal redriver includes a redriver circuit, a terminal resistor, a switch and a monitoring circuit. The redriver circuit has an input end coupled to a high-speed receiving end of the signal redriver. An output end of the redriver circuit is coupled to a high-speed transmitting end of the signal redriver. The terminal resistor and the switch are connected in series between the high-speed receiving end of the signal redriver and a reference voltage. The monitoring circuit is coupled to a first control signal transceiving end of a transmitting device and a second control signal transceiving end of a receiving device. The monitoring circuit is configured to monitor a control signal transmitted between the first control signal transceiving end of the transmitting device and the second control signal transceiving end of the receiving device to determine whether to enter a SLEEP mode. The monitoring circuit in the SLEEP mode continuously turns on the switch, and the monitoring circuit in a DISCONNECT mode turns off the switch.

In an embodiment of the disclosure, the control method of the signal redriver includes: providing the signal redriver between a transmitting device and a receiving device, wherein a first high-speed transmitting end of the transmitting device and a first high-speed receiving end of the receiving device are respectively coupled to a second high-speed receiving end and a second high-speed transmitting end of the signal redriver; monitoring a control signal transmitted between a first control signal transceiving end of the transmitting device and a second control signal transceiving end of the receiving device by the signal redriver; determining whether the signal redriver enters a SLEEP mode based on the control signal; and making a terminal resistor of the signal redriver to be continuously coupled to the second high-speed receiving end of the signal redriver in the SLEEP mode.

Based on the above description, in the high-speed transmission system, the signal redriver, and the control method of the signal redriver provided in one or more of the embodiments of the disclosure, it is possible to determine whether the signal redriver enters the SLEEP mode by monitoring the control signal transmitted between the transmitting device and the receiving device, and in the SLEEP mode, the terminal resistor of the signal redriver is continuously coupled to the high-speed receiving end of the signal redriver, so as to be coupled to the high-speed transmitting end of the transmitting device. As such, the power consumption of the signal redriver is reduced while a terminal impedance of the transmitting device is maintained.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
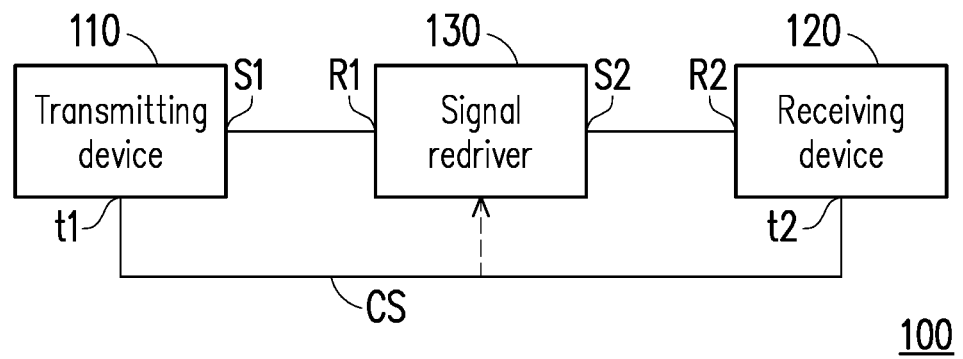
FIG. 1 is a schematic circuit block diagram of a high-speed transmission system according to an embodiment of the disclosure.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. "first", "second", etc. mentioned in the specification and the claims are merely used to name discrete components and should not be regarded as limiting the upper or lower bound of the number of the components, nor is it used to define a manufacturing order or setting order of the components. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic diagram of a high-speed transmission system 100 according to an embodiment of the disclosure. According to an actual design, the high-speed transmission system 100 may be a peripheral component interconnect express (PCIe) system or other transmission systems. In the embodiment shown in FIG. 1, the high-speed transmission system 100 includes a transmitting device 110, a receiving device 120, and a signal redriver 130. The transmitting device 110 has a high-speed transmitting end S1 and a control signal transceiving end t1. The receiving device 120 has a high-speed receiving end R2 and a control signal transceiving end t2. The signal redriver 130 is coupled between the transmitting device 110 and the receiving device 120. For example, a high-speed receiving end R1 of the signal redriver 130 is coupled to the high-speed transmitting end S1 of the transmitting device 110, and a high-speed transmitting end S2 of the signal redriver 130 is coupled to the high-speed receiving end R2 of the receiving device 120. According to a design requirement, the signal redriver 130 may be provided in the form of a circuit board or a cable, which is not limited in the embodiment. For example, in some embodiments, the high-speed receiving end R2 of the receiving device 120 may be coupled to the high-speed transmitting end S1 of the transmitting device 110 through a cable, and the signal redriver 130 may be configured in this cable. In some other embodiments, the transmitting device 110, the receiving device 120 and the signal redriver 130 may be three integrated circuits. In still other embodiments, the transmitting device 110 and the signal redriver 130 may be integrated into one integrated circuit, and the receiving device 120 may be another integrated circuit. In other embodiments, the transmitting device 110 may be an integrated circuit, and the receiving device 120 and the signal redriver 130 may be integrated into another integrated circuit.

A control signal CS is transmitted between the control signal transceiving end t1 of the transmitting device 110 and the control signal transceiving end t2 of the receiving device 120. According to an actual design, in some embodiments, the transmitting device 110 may transmit the control signal CS to the control signal transceiving end t2 of the receiving device 120 through the control signal transceiving end t1. In other embodiments, the receiving device 120 may transmit the control signal CS to the control signal transceiving end t1 of the transmitting device 110 through the control signal transceiving end t2. In still some embodiments, other circuits that are not shown in FIG. 1 may transmit the control signal CS to the control signal transceiving end t1 of the transmitting device 110 and the control signal transceiving end t2 of the receiving device 120. Based on the control signal CS, the transmitting device 110 and/or the receiving device 120 may decide whether to enter a power saving mode.

The signal redriver 130 may monitor the control signal CS transmitted between the control signal transceiving end t1 of the transmitting device 110 and the control signal transceiving end t2 of the receiving device 120. This embodiment does not limit the meaning of "monitor". The meaning of the word "monitor" in this embodiment includes but is not limited to "snoop", "listen" or "capture". Based on the control signal CS, the signal redriver 130 may decide whether to enter a SLEEP mode. When the signal redriver 130 enters the SLEEP mode from a STANDBY mode (a normal operating state), a terminal resistor inside the signal redriver 130 will be continuously coupled to the high-speed receiving end R1 of the signal redriver 130, and most of the circuits inside the signal redriver 130 are turned off to reduce the power consumption of the signal redriver 130. Since the terminal resistor of the signal redriver 130 is continuously coupled to the high-speed receiving end R1 of the signal redriver 130 in the SLEEP mode, the signal redriver 130 in the SLEEP mode still complies with terminal specifications of the high-speed transmission system 100. After the signal redriver 130 returns to the STANDBY mode (the normal operating state) from the SLEEP mode, a response time of re-activating the signal redriver 130 may meet a time specification of the high-speed transmission system 100.

Figure 2:
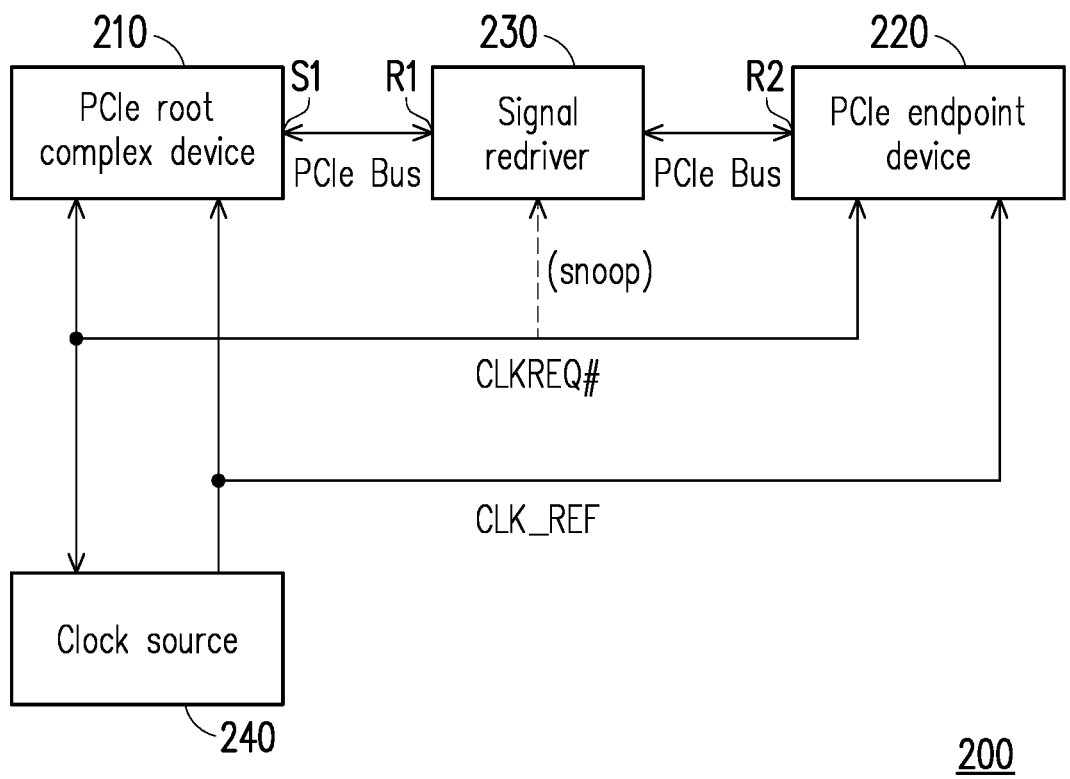
FIG. 2 is a schematic circuit block diagram of a high-speed transmission system according to another embodiment of the disclosure.

For example, FIG. 2 is a schematic diagram of a high-speed transmission system 200 according to another embodiment of the disclosure. In the embodiment shown in FIG. 2, the high-speed transmission system 200 includes a PCIe root complex device 210, a PCIe endpoint device 220, and a signal redriver 230. According to an actual design, in some embodiments, the PCIe root complex device 210 shown in FIG. 2 may be an implementation example of the transmitting device 110 shown in FIG. 1, or the PCIe root complex device 210 shown in FIG. 2 may be an internal component of the transmitting device 110 shown in FIG. 1. The PCIe endpoint device 220 shown in FIG. 2 may be an implementation example of the receiving device 120 shown in FIG. 1, or the PCIe endpoint device 220 shown in FIG. 2 may be an internal component of the receiving device 120 shown in FIG. 1. According to the actual design, the signal redriver 230 shown in FIG. 2 may be deduced by analogy with reference to the related description of the signal redriver 130 shown in FIG. 1, and (or) the signal redriver 130 shown in FIG. 1 may be deduced by analogy with reference to the related description of the signal redriver 230 shown in FIG. 2.

In the embodiment shown in FIG. 2, the high-speed transmitting end S1 of the PCIe root complex device 210 may be coupled to the high-speed receiving end R2 of the PCIe endpoint device 220 through a PCIe bus and the signal redriver 230. In the embodiment shown in FIG. 2, the high-speed transmission system 200 further includes a clock source 240. Clock ends of the PCIe root complex device 210 and the PCIe endpoint device 220 are commonly coupled to an output end of the clock source 240 to receive a reference clock signal CLK_REF. According to an actual design, a clock request signal CLKREQ #shown in FIG. 2 may be an implementation example of the control signal CS shown in FIG. 1, or the clock request signal CLKREQ #shown in FIG. 2 may be one of a plurality of components of the control signal CS shown in FIG. 1. The PCIe root complex device 210 and/or the PCIe endpoint device 220 may send the clock request signal CLKREQ #that complies with the PCIe specification to the clock source 240 through the control signal transceiving ends. According to the clock request signal CLKREQ #, the clock source 240 may determine whether to generate the reference clock signal CLK_REF to the PCIe root complex device 210 and the PCIe endpoint device 220. For example, when the clock request signal CLKREQ #is at a first logic level (for example, a high logic level), the reference clock signal CLK_REF is cancelled, i.e., the PCIe root complex device 210 and/or the PCIe endpoint device 220 enter the power saving mode (for example, an L1.2 low power consumption link state under the PCIe specification). When the clock request signal CLKREQ #is at a second logic level (for example, a low logic level), the reference clock signal CLK_REF is provided to the PCIe root complex device 210 and the PCIe endpoint device 220, i.e., both of the PCIe root complex device 210 and the PCIe endpoint device 220 operate in a normal mode. The clock request signal CLKREQ #is a signal that complies with the PCIe specification, so that the details of the clock request signal CLKREQ #are not repeated here.

In the embodiment, the signal redriver 230 may monitor the clock request signal CLKREQ #(the control signal CS) transmitted between the PCIe root complex device 210, the PCIe endpoint device 220, and the clock source 240. In this way, the signal redriver 230 may switch a working mode according to the clock request signal CLKREQ #. For example, in the embodiment, when the clock request signal CLKREQ #is at the first logic level (such as the high logic level), the signal redriver 230 may enter the SLEEP mode (in the SLEEP mode, the terminal resistor of the signal redriver 230 is continuously coupled to the high-speed receiving end R1 of the signal redriver 230). When the clock request signal CLKREQ #is at the second logic level (for example, the low logic level), the signal redriver 230 may end the SLEEP mode.

Figure 3:
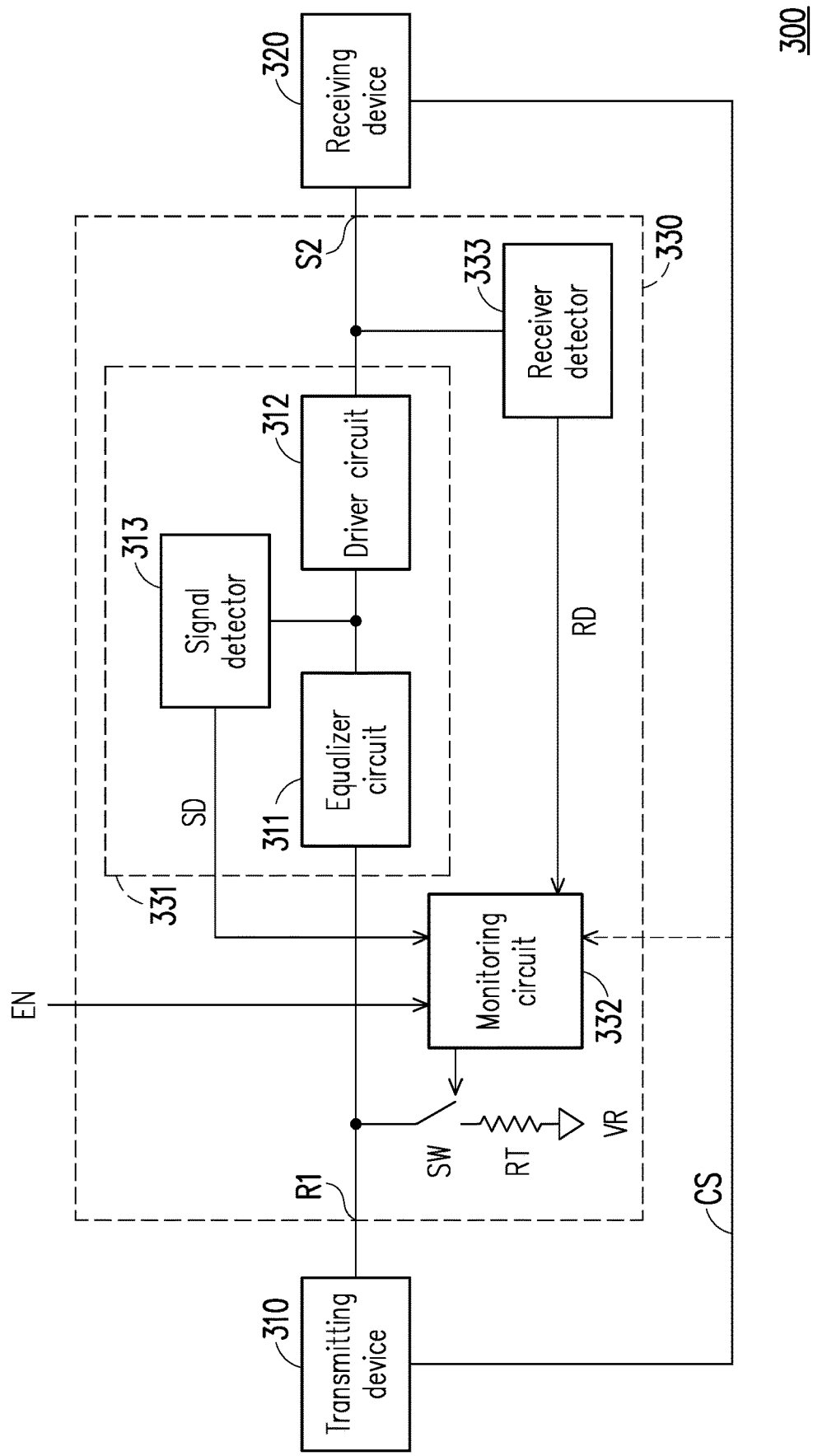
FIG. 3 is a schematic circuit block diagram of a high-speed transmission system according to still another embodiment of the disclosure.

FIG. 3 is a schematic circuit block diagram of a high-speed transmission system 300 according to still another embodiment of the disclosure. The high-speed transmission system 300 shown in FIG. 3 includes a transmitting device 310, a receiving device 320, and a signal redriver 330. According to an actual design, in some embodiments, the PCIe root complex device 210 shown in FIG. 2 may be an implementation example of the transmitting device 310 shown in FIG. 3, or the PCIe root complex device 210 shown in FIG. 2 may be an internal component of the transmitting device 310 shown in FIG. 3. The PCIe endpoint device 220 shown in FIG. 2 may be an implementation example of the receiving device 320 shown in FIG. 3, or the PCIe endpoint device 220 shown in FIG. 2 may be an internal component of the receiving device 320 shown in FIG. 3. In some other embodiments, the transmitting device 310 and the receiving device 320 shown in FIG. 3 may be deduced by analogy with reference to the related descriptions of the transmitting device 110 and the receiving device 120 shown in FIG. 1, or the transmitting device 110 and the receiving device 120 shown in FIG. 1 may be deduced by analogy with reference to the related descriptions of the transmitting device 310 and the receiving device 320 shown in FIG. 3, so that details thereof are not repeated.

According to an actual design, in some embodiments, the signal redriver 230 shown in FIG. 2 may be deduced by analogy with reference to the related description of the signal redriver 330 shown in FIG. 3, and/or the signal redriver 330 shown in FIG. 3 may be deduced by analogy with reference to the related description of the signal redriver 230 shown in FIG. 2. In some other embodiments, the signal redriver 330 shown in FIG. 3 may be deduced by analogy with reference to the related description of the signal redriver 130 shown in FIG. 1, or the signal redriver 130 shown in FIG. 1 may be deduced by analogy with reference to the related description of the signal redriver 330 shown in FIG. 3. In the embodiment shown in FIG. 3, the signal redriver 330 includes a redriver circuit 331, a monitoring circuit 332, a terminal resistor RT, and a switch SW. The monitoring circuit 332 may include a microcontroller or other control/processing circuits.

The terminal resistor RT and the switch SW may be connected in series between the high-speed receiving end R1 of the signal redriver 330 and a reference voltage VR. For example, a first end of the terminal resistor RT is coupled to the reference voltage VR, a first end of the switch SW is coupled to a second end of the terminal resistor RT, and a second end of the switch SW is coupled to the high-speed receiving end R1 of the signal redriver 330. It should be noted that the connection manner of the terminal resistor RT and the switch SW shown in FIG. 3 is just an example. In other embodiments, positions of the terminal resistor RT and the switch SW may be exchanged or the terminal resistor RT and the switch SW may be coupled to the high-speed receiving end R1 in other forms, which is not limited by the disclosure. The reference voltage VR may be, for example, a ground voltage or other fixed voltages, which is not limited in the embodiment.

An input end of the redriver circuit 331 is coupled to the high-speed receiving end R1 of the signal redriver 330. An output end of the redriver circuit 331 is coupled to the high-speed transmitting end S2 of the signal redriver 330. The redriver circuit 331 may increase quality of signals on a high-speed transmission channel between the transmitting device 310 and the receiving device 320.

The monitoring circuit 332 may monitor the control signal CS transmitted between the control signal transceiving end of the transmitting device 310 and the control signal transceiving end of the receiving device 320 to determine whether the signal redriver 330 enters the SLEEP mode. In an application situation where the transmitting device 310 and the receiving device 320 are PCIe devices, the control signal CS may include the clock request signal CLKREQ #that complies with the PCIe specification and/or other PCIe signals. The monitoring circuit 332 may control the switch SW according to the control signal CS. When the control signal CS (for example, the clock request signal CLKREQ

) is at the first logic level, the signal redriver 330 may enter the SLEEP mode; and when the control signal CS (for example, the clock request signal CLKREQ #) is at the second logic level, the signal driver 330 may end the SLEEP mode. When the signal redriver 330 is in the SLEEP mode, the monitoring circuit 332 may continuously turn on the switch SW, i.e., the terminal resistor RT may be continuously coupled to the high-speed receiving end R1 of the signal redriver 330. When the signal redriver 330 ends the SLEEP mode and returns to the STANDBY mode (the normal operating state), the monitoring circuit 332 continuously turns on the switch SW. When the signal redriver 330 is operated in either the STANDBY mode or an ACTIVE mode, the monitoring circuit 332 continuously turns on the switch SW. When the transmitting device 310 and (or) the receiving device 320 are (is) disconnected from the signal redriver 330, the signal redriver 330 may enter a DISCONNECT mode. According to an actual design, in some embodiments, the monitoring circuit 332 in the DISCONNECT mode may turn off the switch SW.

In the embodiment shown in FIG. 3, according to the design requirement, the signal redriver 330 may further include a receiver detector 333. The receiver detector 333 is coupled to the high-speed transmitting end S2 of the signal redriver 330. The receiver detector 333 may detect whether the high-speed transmitting end S2 of the signal redriver 330 is coupled to the high-speed receiving end R2 of the receiving device 320, and output a detection signal RD.

In the embodiment, the redriver circuit 331 may include an equalizer circuit 311 and a driver circuit 312. An input end of the equalizer circuit 311 may be coupled to the high-speed receiving end R1 of the signal redriver 330. The equalizer circuit 311 may be used to optimize a transmission signal received by the signal redriver 330. An input end of the driver circuit 312 may be coupled to an output end of the equalizer circuit 311. An output end of the driver circuit 312 may be coupled to the high-speed transmitting end S2 of the signal redriver 330. In the embodiment shown in FIG. 3, according to a design requirement, the redriver circuit 331 may further include a signal detector 313. The signal detector 313 is coupled to the output end of the equalizer circuit 311. The signal detector 313 may detect whether there is a valid signal at the output end of the equalizer circuit 311 and output a valid detection signal SD.

According to different design requirements, blocks of the aforementioned monitoring circuit 332, the receiver detector 333, and/or the signal detector 313 may be implemented in the form of hardware, firmware, and software (i.e., programs) or a combination thereof.

In terms of hardware, the aforementioned monitoring circuit 332, the receiver detector 333 and/or the signal detector 313 may be implemented by logic circuits on an integrated circuit. The related functions of the aforementioned monitoring circuit 332, the receiver detector 333 and/or the signal detector 313 may be implemented as hardware by using hardware description languages (for example, Verilog HDL or VHDL) or other suitable programming languages. For example, the related functions of the aforementioned monitoring circuit 332, the receiver detector 333 and/or the signal detector 313 may be implemented by one or a plurality of controllers, microcontrollers, microprocessors, application-specific integrated circuits (ASIC), digital signal processors (DSP), field programmable gate arrays (FPGA), and/or various logic blocks, modules and circuits in other processing units.

In terms of software and/or firmware, relevant functions of the monitoring circuit 332, the receiver detector 333, and/or the signal detector 313 may be implemented as programming codes. For example, the monitoring circuit 332, the receiver detector 333, and/or the signal detector 313 may be implemented as general programming languages (such as C, C++, or assembly languages) or other suitable programming languages. The programming codes may be recorded/stored in a "non-transitory computer readable medium". In some embodiments, the non-transitory computer readable medium includes, for example, a read-only memory (ROM), a tape, a disk, a card, a semiconductor memory, a programmable logic circuit, and/or a storage device. The storage device includes a hard disk drive (HDD), a solid-state drive (SSD) or other storage devices. A central processing unit (CPU), a controller, a microcontroller, or a microprocessor may read and execute the programming code from the non-transitory computer readable medium, thereby realizing the relevant functions of the monitoring circuit 332, the receiver detector 333, and/or the signal detector 313.

Figure 4:
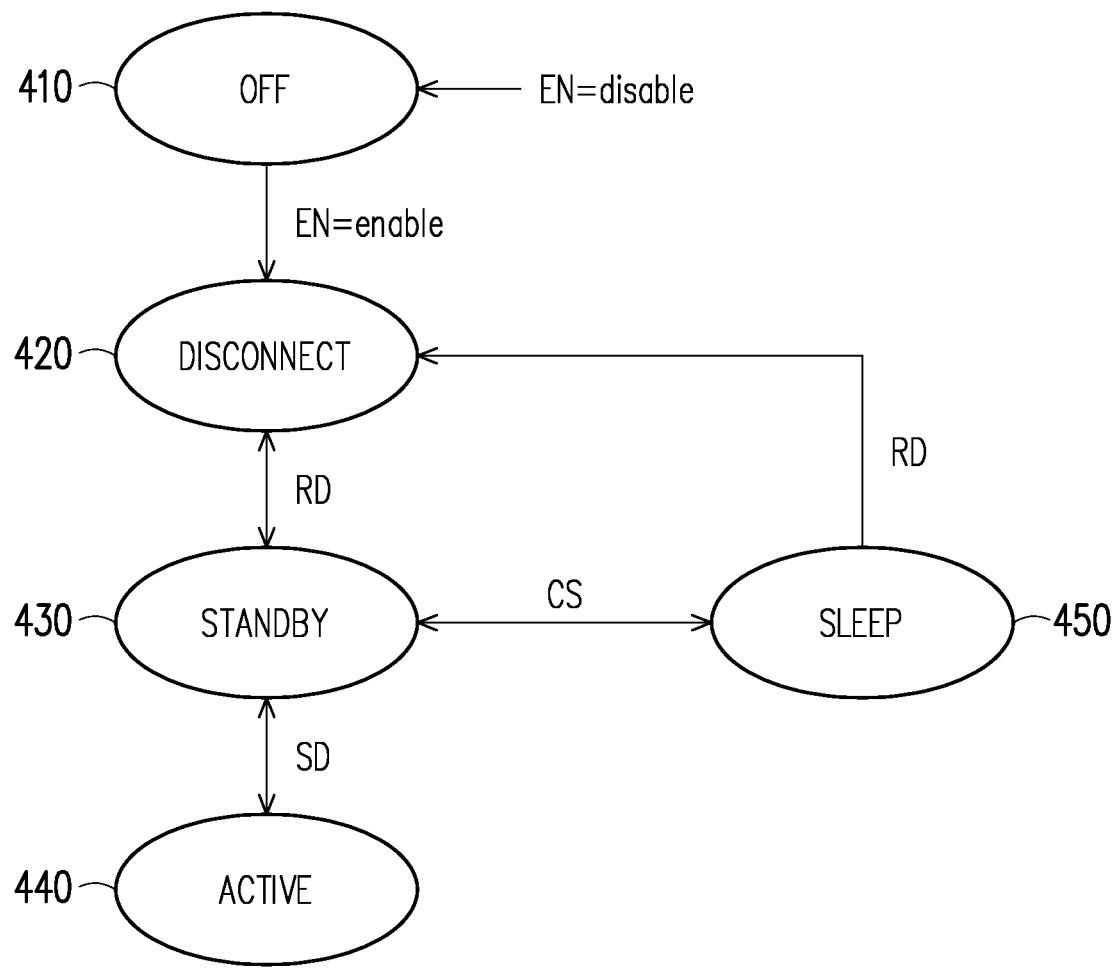
FIG. 4 is a schematic diagram of a finite-state machine of the signal redriver shown in FIG. 3 according to an embodiment of the disclosure.

FIG. 4 is a schematic diagram of a finite-state machine of the signal redriver 330 shown in FIG. 3 according to an embodiment of the disclosure. In the embodiments shown in FIG. 3 and FIG. 4, the signal redriver 330 may have a plurality of working modes, and may switch enabling states of internal circuit elements in different working mode states. For example, in the embodiment shown in FIG. 4, the working mode of the signal redriver 330 may include an OFF mode 410, a DISCONNECT mode 420, a STANDBY mode 430, an ACTIVE mode 440 and a SLEEP mode 450. It should be noted that the working modes described in the embodiment are only an example. In other embodiments, the signal redriver 330 may also include other working modes or have fewer working modes.

In the embodiment, the signal redriver 330 may switch the working mode to the OFF mode 410 or the DISCONNECT mode 420 according to an enabling signal EN input from external. For example, when the signal redriver 330 receives the enabling signal EN to be disabled, the signal redriver 330 may enter the OFF mode 410 from any mode. In the OFF mode 410, when the signal redriver 330 receives the enabling signal EN to be enabled, the OFF mode 410 may be ended to enter the DISCONNECT mode 420.

In the DISCONNECT mode 420, the signal redriver 330 may determine whether to switch the working mode of the signal redriver 330 from the DISCONNECT mode 420 to the STANDBY mode 430 or from the STANDBY mode 430 to the DISCONNECT mode 420 according to the detection signal RD output by the receiver detector 333. For example, when the detection signal RD output by the receiver detector 333 indicates that the high-speed transmitting end S2 of the signal redriver 330 is coupled to the high-speed receiving end of the receiving device 320 and the signal redriver 330 is in the DISCONNECT mode 420, the working mode of the signal redriver 330 may be switched from the DISCONNECT mode 420 to the STANDBY mode 430. When the detection signal RD output by the receiver detector 333 indicates that the high-speed transmitting end S2 of the signal redriver 330 is not coupled to any receiving device and the signal redriver 330 is in the STANDBY mode 430 (or the SLEEP mode 450), the working mode of the signal redriver 330 may be switched from the STANDBY mode 430 (or the SLEEP mode 450) to the DISCONNECT mode 420.

In the STANDBY mode, the signal redriver 330 may determine whether to switch the working mode of the signal redriver 330 from the STANDBY mode 430 to the ACTIVE mode 440 according to the valid detection signal SD output by the signal detector 313. For example, when the valid detection signal SD output by the signal detector 313 indicates that the output of the equalizer circuit 311 is a valid signal (i.e., the high-speed receiving end R1 of the signal redriver 330 receives a valid signal from the transmitting device 310) and the signal redriver 330 is in the STANDBY mode 430, the working mode of the signal redriver 330 may be switched from the STANDBY mode 430 to the ACTIVE mode 440 (a normal working mode). When the valid detection signal SD output by the signal detector 313 indicates that the equalizer circuit 311 does not output a valid signal (i.e., the high-speed receiving end R1 of the signal redriver 330 does not receive a valid signal from the transmitting device 310) and the signal redriver 330 is in the ACTIVE mode 440, the working mode of the signal redriver 330 may be switched from the ACTIVE mode 440 back to the STANDBY mode 430.

In the STANDBY mode 430, the signal redriver 330 may determine whether to switch the working mode of the signal redriver 330 from the STANDBY mode 430 to the SLEEP mode 450 according to the control signal CS transmitted between the transmitting device 310 and the receiving device 320. For example, when the control signal CS transmitted between the transmitting device 310 and the receiving device 320 is a preset first logic level and the signal redriver 330 is in the STANDBY mode 430, the working mode of the signal redriver 330 may be switched from STANDBY mode 430 to the SLEEP mode 450. When the control signal CS transmitted between the transmitting device 310 and the receiving device 320 is a preset second logic level and the signal redriver 330 is in the SLEEP mode 450, the working mode of the signal redriver 330 is switched back from the SLEEP mode 450 to the STANDBY mode 430. In addition, in the SLEEP mode 450, when the detection signal RD output by the receiver detector 333 indicates that the receiving device 320 originally coupled to the high-speed transmitting end S2 of the signal redriver 330 has been disconnected, the working mode of the signal redriver 330 may be switched from the SLEEP mode 450 back to the DISCONNECT mode 420. In some embodiments, the power consumption of the signal redriver 330 in the SLEEP mode 450 may be less than the power consumption in the STANDBY mode 430.

In another example, Table 1 below is a table illustrating enabling states of the internal circuit components of the signal redriver 330 shown in FIG. 3 according to an embodiment of the disclosure. A vertical axis shown in Table 1 represents the internal circuit components of the signal redriver 330 shown in FIG. 3, including the terminal resistor RT, the equalizer circuit 311, the driver circuit 312, the signal detector 313, and the receiver detector 333. A horizontal axis shown in Table 1 represents the working modes of the signal redriver 330, including the DISCONNECT mode 420, the ACTIVE mode 440, the STANDBY mode 430, and the SLEEP mode 450 shown in FIG. 4. "X" shown in Table 1 represents "disable", "turn off" or "disconnect". "O" shown in Table 1 represents "enable", "turn on" or "connect". The enabling states of the circuit components shown in Table 1 are only an example, and the embodiment is not limited thereto.

TABLE 1 working modes and enabling relationship of the internal components of the signal redriver 330

|  | DISCONNECT | ACTIVE | STANDBY | SLEEP |
| --- | --- | --- | --- | --- |
| Terminal resistor | X | O | O | O |
| Equalizer circuit | X | O | O | X |
| Driver circuit | X | O | X | X |
| Signal detector | X | O | O | X |
| Receiver detector | O | X | O | O |

Referring to FIG. 3, FIG. 4, and Table 1, in the embodiment, when the signal redriver 330 is in the DISCONNECT mode 420, for example, only the receiver detector 333 is enabled to detect a coupling state of the high-speed transmitting end S2 of the signal redriver 330. In the DISCONNECT mode 420, the switch SW is turned off (i.e., the terminal resistor RT is disconnected from the high-speed receiving end R1 of the signal redriver 330), and the equalizer circuit 311, the driver circuit 312, the signal detector 313 and the receiver detector 333 are disabled or turned off. When the signal redriver 330 is in the ACTIVE mode 440, the receiver detector 333 may be disabled to reduce the power consumption of the signal redriver 330 in the ACTIVE mode 440. In the ACTIVE mode 440, the switch SW is turned on (i.e., the terminal resistor RT is connected to the high-speed receiving end R1 of the signal redriver 330), and the equalizer circuit 311, the driver circuit 312, and the signal detector 313 are enabled or turned on.

When the signal redriver 330 is in the STANDBY mode 430, for example, only the driver circuit 312 is disabled. In the STANDBY mode 430, the switch SW is turned on (i.e., the terminal resistor RT is connected to the high-speed receiving end R1 of the signal redriver 330), and the equalizer circuit 311, the signal detector 313, and the receiver detector 333 are enabled or turned on. When the signal redriver 330 is in the SLEEP mode 450, the receiver detector 333 is enabled and the terminal resistor RT is connected to the high-speed receiving terminal R1 of the signal redriver 330 (i.e., the switch SW is turned on). In the SLEEP mode 450, the equalizer circuit 311, the driver circuit 312, and the signal detector 313 are disabled or turned off.

In other words, the equalizer circuit 311 in the signal redriver 330 is enabled in the ACTIVE mode 440 and the STANDBY mode 430, and disabled in the DISCONNECT mode 420 and the SLEEP mode 450. The driver circuit 312 is enabled in the ACTIVE mode 440, and disabled in the DISCONNECT mode 420, the STANDBY mode 430, and the SLEEP mode 450. The signal detector 313 is enabled in the ACTIVE mode 440 and the STANDBY mode 430, and disabled in the DISCONNECT mode 420 and the SLEEP mode 450. The receiver detector 333 is enabled in the DISCONNECT mode 420, the STANDBY mode 430, and the SLEEP mode 450, and may be disabled in the ACTIVE mode 440. In the embodiment, the monitoring circuit 332 may control the switch SW to continuously turn on the switch SW when the signal redriver 330 is in the SLEEP mode 450, the STANDBY mode 430, and the ACTIVE mode 440, and turn off the switch SW when the signal redriver 330 is in the DISCONNECT mode 420. In this way, when the signal redriver 330 is in the SLEEP mode 450, the redriver circuit 331 may be disabled to reduce the power consumption of the signal redriver 330 under the premise of maintaining the terminal resistor RT to be enabled.

Figure 5:
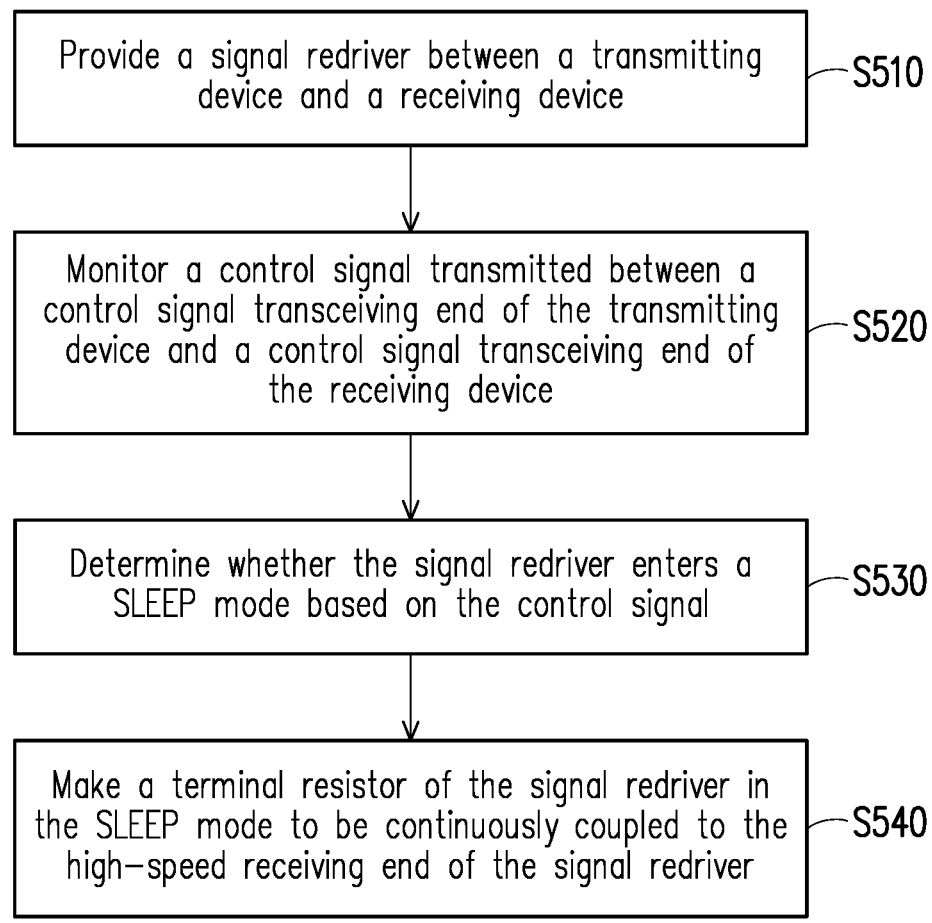
FIG. 5 is a schematic flowchart illustrating a control method of a signal redriver according to an embodiment of the disclosure.

FIG. 5 is a schematic flowchart illustrating a control method of a signal redriver according to an embodiment of the disclosure. According to an actual design, related description of the control method shown in FIG. 5 may be adapted to the signal redriver 130 shown in FIG. 1, the signal redriver 230 shown in FIG. 2, and/or the signal redriver 330 shown in FIG. 3. Here, the circuit block diagram shown in FIG. 1 is used to assist explaining the control method shown in FIG. 5.

With reference to FIG. 1 and FIG. 5, in step S510, the signal redriver 130 is provided between the transmitting device 110 and the receiving device 120, where the high-speed transmitting end S1 of the transmitting device 110 is coupled to the high-speed receiving end R1 of the signal redriver 130, and the first high-speed receiving end R2 of the receiving device 120 is coupled to the high-speed transmitting end S2 of the signal redriver 130. In step S520, the signal redriver 130 monitors the control signal CS transmitted between the control signal transceiving end t1 of the transmitting device 110 and the control signal transceiving end t2 of the receiving device 120. In step S530, the signal redriver 130 determines whether to enter the SLEEP mode 450 based on the control signal CS. In step S540, the signal redriver 130 makes the terminal resistor (for example, the terminal resistor RT shown in FIG. 3) of the signal redriver 130 in the SLEEP mode 450 to be continuously coupled to the high-speed receiving end R1 of the signal redriver 130.

In summary, in the high-speed transmission system and the signal redriver provided in one or more of the embodiments of the disclosure, it is possible to determine whether the signal redriver enters the SLEEP mode by monitoring the control signal CS (e.g., the clock request signal CLKREQ #) transmitted between the transmitting device and the receiving device, and in the SLEEP mode 450, the terminal resistor RT of the signal redriver may be continuously coupled to the high-speed receiving end R1 of the signal redriver. The power consumption of the signal redriver may be reduced as much as possible on the premise of maintaining a terminal impedance of the high-speed receiving end R1.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A high-speed transmission system, comprising:
   a transmitting device, having a first high-speed transmitting end and a first control signal transceiving end;
   a receiving device, having a first high-speed receiving end and a second control signal transceiving end, wherein the second control signal transceiving end is coupled to the first control signal transceiving end; and
   a signal redriver, coupled between the transmitting device and the receiving device, having a second high-speed receiving end coupled to the first high-speed transmitting end of the transmitting device, having a second high-speed transmitting end coupled to the first high-speed receiving end of the receiving device, and coupled to the first control signal transceiving end and the second control signal transceiving end,
   wherein the signal redriver monitors a control signal transmitted between the first control signal transceiving end and the second control signal transceiving end, and the signal redriver determines whether to enter a SLEEP mode based on the control signal,
   wherein the signal redriver comprises a terminal resistor, a switch, a redriver circuit and a monitoring circuit, an input end of the redriver circuit is coupled to the second high-speed receiving end of the signal redriver, an output end of the redriver circuit is coupled to the second high-speed transmitting end of the signal redriver, the terminal resistor and the switch are connected in series with each other between the second high-speed receiving end of the signal redriver and a reference voltage, the monitoring circuit is configured to monitor the control signal transmitted between the transmitting device and the receiving device to determine whether to enter the SLEEP mode, the monitoring circuit in the SLEEP mode continuously turns on the switch so that the terminal resistor of the signal redriver in the SLEEP mode is continuously coupled to the second high-speed receiving end of the signal redriver, and the monitoring circuit in a DISCONNECT mode turns off the switch.

2. The high-speed transmission system according to claim 1, wherein the first high-speed transmitting end of the transmitting device is coupled to the first high-speed receiving end of the receiving device through a peripheral component interconnect express bus and the signal redriver, the transmitting device comprises a peripheral component interconnect express root complex device, and the receiving device comprises a peripheral component interconnect express endpoint device.

3. The high-speed transmission system according to claim 1, wherein the control signal comprises a clock request signal that complies with a peripheral component interconnect express specification, when the clock request signal is at a first logic level, the signal redriver enters the SLEEP mode, and when the clock request signal is at a second logic level, the signal redriver ends the SLEEP mode.

4. The high-speed transmission system according to claim 1, wherein a first end of the terminal resistor is coupled to the reference voltage, a first end of the switch is coupled to a second end of the terminal resistor, and a second end of the switch is coupled to the second high-speed receiving end of the signal redriver.

5. The high-speed transmission system according to claim 1, wherein the monitoring circuit further continuously turns on the switch when the monitoring circuit is in a STANDBY mode and an ACTIVE mode.

6. The high-speed transmission system according to claim 5, wherein the signal redriver further comprises:
   a receiver detector, coupled to the second high-speed transmitting end of the signal redriver and configured to detect whether the second high-speed transmitting end of the signal redriver is coupled to the first high-speed receiving end of the receiving device, wherein the receiver detector is enabled in the DISCONNECT mode, the STANDBY mode, and the SLEEP mode, and the receiver detector is disabled in the ACTIVE mode.

7. The high-speed transmission system according to claim 5, wherein the redriver circuit comprises:
   an equalizer circuit, having an input end coupled to the second high-speed receiving end of the signal redriver, wherein the equalizer circuit is enabled in the ACTIVE mode and the STANDBY mode, and the equalizer circuit is disabled in the DISCONNECT mode and the SLEEP mode; and
   a driver circuit, having an input end coupled to an output end of the equalizer circuit, wherein an output end of the driver circuit is coupled to the second high-speed transmitting end of the signal redriver, the driver circuit is enabled in the ACTIVE mode, and the driver circuit is disabled in the DISCONNECT mode, the STANDBY mode, and the SLEEP mode.

8. The high-speed transmission system according to claim 7, wherein the redriver circuit further comprises:
a signal detector, coupled to the output end of the equalizer circuit and configured to detect whether the output end of the equalizer circuit has a valid signal, wherein the signal detector is enabled in the ACTIVE mode and the STANDBY mode, and the signal detector is disabled in the DISCONNECT mode and the SLEEP mode.

9. A signal redriver, coupled between a transmitting device having a first high-speed transmitting end and a receiving device having a first high-speed receiving end, comprising:
a redriver circuit, having an input end coupled to a second high-speed receiving end of the signal redriver, wherein an output end of the redriver circuit is coupled to a second high-speed transmitting end of the signal redriver, the second high-speed receiving end is coupled to the first high-speed transmitting end of the transmitting device, and the second high-speed transmitting end is coupled to the first high-speed receiving end of the receiving device;
a terminal resistor and a switch, connected in series between the second high-speed receiving end of the signal redriver and a reference voltage; and
a monitoring circuit, coupled to a first control signal transceiving end of the transmitting device and a second control signal transceiving end of the receiving device, and configured to monitor a control signal transmitted between the first control signal transceiving end and the second control signal transceiving end to determine whether to enter a SLEEP mode based on the control signal, wherein the monitoring circuit in the SLEEP mode continuously turns on the switch so that the terminal resistor in the SLEEP mode is continuously coupled to the second high-speed receiving end of the signal redriver, and the monitoring circuit in a DISCONNECT mode turns off the switch.

10. The signal redriver according to claim 9, wherein the control signal comprises a clock request signal that complies with a peripheral component interconnect express specification, when the clock request signal is at a first logic level, the signal redriver enters the SLEEP mode, and when the clock request signal is at a second logic level, the signal redriver ends the SLEEP mode.

11. The signal redriver according to claim 9, wherein a first end of the terminal resistor is coupled to the reference voltage, a first end of the switch is coupled to a second end of the terminal resistor, and a second end of the switch is coupled to the second high-speed receiving end of the signal redriver.

12. The signal redriver according to claim 9, wherein the monitoring circuit further continuously turns on the switch when the monitoring circuit is in a STANDBY mode and an ACTIVE mode.

13. The signal redriver according to claim 12, further comprising:
a receiver detector, coupled to the second high-speed transmitting end of the signal redriver and configured to detect whether the second high-speed transmitting end of the signal redriver is coupled to the second high-speed receiving end of the receiving device, wherein the receiver detector is enabled in the DISCONNECT mode, the STANDBY mode, and the SLEEP mode, and the receiver detector is disabled in the ACTIVE mode.

14. The signal redriver according to claim 12, wherein the redriver circuit comprises:
an equalizer circuit, having an input end coupled to the second high-speed receiving end of the signal redriver, wherein the equalizer circuit is enabled in the ACTIVE mode and the STANDBY mode, and the equalizer circuit is disabled in the DISCONNECT mode and the SLEEP mode; and
a driver circuit, having an input end coupled to an output end of the equalizer circuit and an output end coupled to the second high-speed transmitting end of the signal redriver, wherein the driver circuit is enabled in the ACTIVE mode, and the driver circuit is disabled in the DISCONNECT mode, the STANDBY mode, and the SLEEP mode.

15. The signal redriver according to claim 14, wherein the redriver circuit further comprises:
a signal detector, coupled to the output end of the equalizer circuit and configured to detect whether the output end of the equalizer circuit has a valid signal, wherein the signal detector is enabled in the ACTIVE mode and the STANDBY mode, and the signal detector is disabled in the DISCONNECT mode and the SLEEP mode.

16. A control method of a signal redriver coupled between a transmitting device and a receiving device, comprising:
providing the signal redriver between the transmitting device and the receiving device, wherein a first high-speed transmitting end of the transmitting device and a first high-speed receiving end of the receiving device are respectively coupled to a second high-speed receiving end and a second high-speed transmitting end of the signal redriver, the signal redriver comprises a terminal resistor, a switch, a redriver circuit and a monitoring circuit, an input end of the redriver circuit is coupled to the second high-speed receiving end of the signal redriver, an output end of the redriver circuit is coupled to the second high-speed transmitting end of the signal redriver, and the terminal resistor and the switch are connected in series with each other between the second high-speed receiving end of the signal redriver and a reference voltage;
monitoring, by the monitoring circuit, a control signal transmitted between a first control signal transceiving end of the transmitting device and a second control signal transceiving end of the receiving device;
determining whether the signal redriver enters a SLEEP mode based on the control signal;
continuously turning on the switch in the SLEEP mode so as to make the terminal resistor of the signal redriver in the SLEEP mode to be continuously coupled to the second high-speed receiving end of the signal redriver; and
turning off the switch in a DISCONNECT mode.

17. The control method of the signal redriver according to claim 16, further comprising:
the signal redriver entering an OFF mode when the signal redriver receives an enabling signal to be disabled; and
the signal redriver ending the OFF mode and entering a DISCONNECT mode when the signal redriver receives the enabling signal to be enabled.

18. The control method of the signal redriver according to claim 16, further comprising:
the signal redriver entering a STANDBY mode from a DISCONNECT mode when a detection signal indicates that the second high-speed transmitting end of the signal redriver is coupled to the first high-speed receiving end of the receiving device and the signal redriver is in the DISCONNECT mode; and the signal redriver entering the DISCONNECT mode from the STANDBY mode or the SLEEP mode when the detection signal indicates that the second high-speed transmitting end of the signal redriver is not coupled to any receiving device and the signal redriver is in the STANDBY mode or the SLEEP mode.

19. The control method of the signal redriver according to claim 16, further comprising:

the signal redriver entering an ACTIVE mode from a STANDBY mode when a valid detection signal indicates that the second high-speed receiving end of the signal redriver receives a valid signal from the transmitting device and the signal redriver is in the STANDBY mode; and the signal redriver entering the STANDBY mode from the ACTIVE mode when the valid detection signal indicates that the second high-speed receiving end of the signal redriver does not receive the valid signal from the transmitting device and the signal redriver is in the ACTIVE mode.

20. The control method of the signal redriver according to claim 16, further comprising:

the signal redriver entering the SLEEP mode from a STANDBY mode when the control signal is at a first logic level and the signal redriver is in the STANDBY mode; and the signal redriver entering the STANDBY mode from the SLEEP mode when the control signal is at a second logic level and the signal redriver is in the SLEEP mode.

\* \* \* \* \*